US008157640B2

(12) United States Patent
Ansari et al.

(10) Patent No.: US 8,157,640 B2
(45) Date of Patent: Apr. 17, 2012

(54) SWARMING BEHAVIOR IN WAGERING GAME MACHINES

(75) Inventors: Marwan Ansari, Plainfield, IL (US); Benjamin Gomez, Chicago, IL (US); Jeremy Hornik, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 307 days.

(21) Appl. No.: 12/663,988

(22) PCT Filed: Jun. 11, 2008

(86) PCT No.: PCT/US2008/007300

§ 371 (c)(1), (2), (4) Date: Dec. 10, 2009

(87) PCT Pub. No.: WO2009/005578

PCT Pub. Date: Jan. 8, 2009

(65) Prior Publication Data

US 2010/0173689 A1 Jul. 8, 2010

Related U.S. Application Data

(60) Provisional application No. 60/946,588, filed on Jun. 27, 2007.

(51) Int. Cl.
*A63F 13/00* (2006.01)

(52) U.S. Cl. ................................ 463/22; 463/23; 463/31

(58) Field of Classification Search .................... 463/12, 463/22, 23, 30, 31
See application file for complete search history.

(56) References Cited

U.S. PATENT DOCUMENTS

| | | | | |
|---|---|---|---|---|
| 6,306,036 | B1 | 10/2001 | Burns et al. | |
| 6,369,727 | B1 * | 4/2002 | Vincze | 341/131 |
| 7,589,742 | B2 * | 9/2009 | Street et al. | 345/585 |
| 2006/0167917 | A1 * | 7/2006 | Solomon | 707/101 |
| 2006/0287040 | A1 | 12/2006 | Walker et al. | |
| 2007/0024644 | A1 * | 2/2007 | Bailey | 345/633 |
| 2007/0162405 | A1 * | 7/2007 | Parunak et al. | 706/12 |
| 2007/0250212 | A1 * | 10/2007 | Halloran et al. | 700/245 |
| 2010/0153321 | A1 * | 6/2010 | Savvides et al. | 706/13 |

OTHER PUBLICATIONS

"International Application Serial No. PCT/US2008/007300, Search Report mailed Dec. 10, 2008", 4 pgs.

"International Application Serial No. PCT/US2008/007300, Written Opinion mailed Dec. 10, 2008", 8 pgs.

* cited by examiner

*Primary Examiner* — James S McClellan

(74) *Attorney, Agent, or Firm* — Schwegman, Lundberg & Woessner, P.A.

(57) ABSTRACT

Apparatus, systems, and methods may operate to present a wagering game upon which monetary value may be wagered; to present an initial image including a subset of a swarm in space representing a portion of the wagering game; and to determine the actual outcome of the wagering game based on player input indications, swarm behavior modeling, and a selected statistical game outcome. An updated image may then be generated and presented, derived from the initial image and the actual outcome.

20 Claims, 6 Drawing Sheets

SWARMING BEHAVIOR IN WAGERING GAME MACHINES

RELATED APPLICATIONS

This patent application is a U.S. National Stage Filing under 35 U.S.C. 371 from International Patent Application Ser. No. PCT/US2008/007300, filed Jun. 11, 2008, and published on Jan. 8, 2009, as WO 2009/005578 A2 and republished as WO 2009/005578 A3, which claims the priority benefit of U.S. Provisional Patent Application Ser. No. 60/946,588 filed Jun. 27, 2007 and titled "WAGERING GAME MACHINE OPERATION AS DETERMINED BY SWARMING BEHAVIOR", the contents of which are incorporated herein by reference in their entirety.

FIELD

The embodiments disclosed herein relate generally to wagering game machines, including the use of artificial intelligence in wagering game machine play.

LIMITED COPYRIGHT WAIVER

A portion of the disclosure of this patent document contains material to which the claim of copyright protection is made. The copyright owner has no objection to the facsimile reproduction by any person of the patent document or the patent disclosure as it appears in the U.S. Patent and Trademark Office file or records, but reserves all other rights whatsoever. Copyright 2007, 2008 WMS Gaming Inc. All Rights Reserved.

BACKGROUND

Wagering game machine makers strive to provide new and entertaining games on a continuous basis. One way of increasing the entertainment value associated with casino-style wagering games (e.g., video slots, video poker, video black jack, and the like) includes offering a variety of base games and bonus events. However, even when new base games and bonus events are introduced, player interest may lessen after repetitive play, once the content of the base games and bonus events has essentially been exhausted.

DETAILED DESCRIPTION

Figure 1:
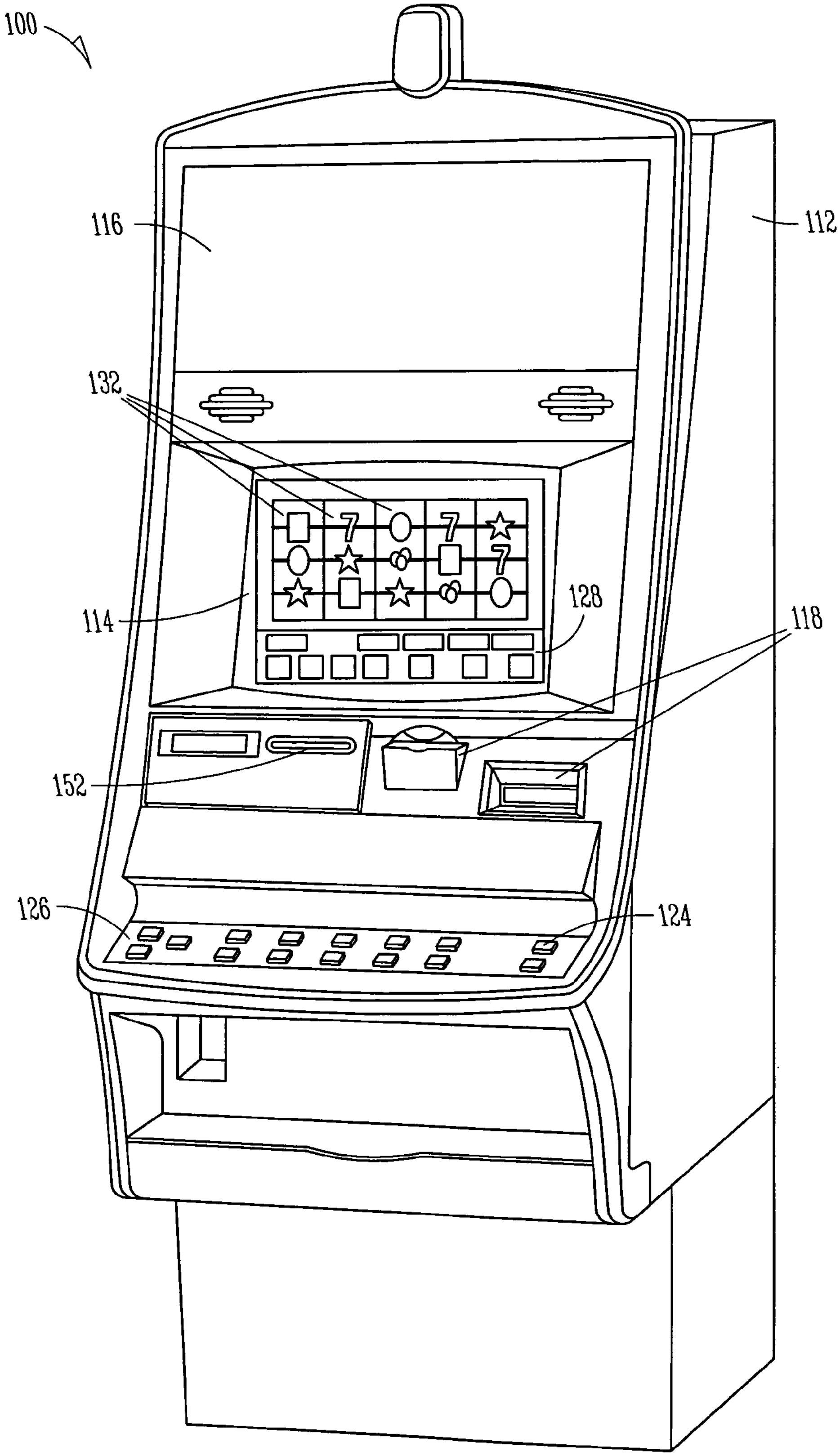
FIG. 1 is a perspective view of a wagering game machine, according to example embodiments of the invention.

In general, embodiments of the invention disclosed herein address some of the challenges described above by augmenting wagering game machine play with artificial intelligence in the form of swarm behavior. The relatively unexpected behavior of swarms, operating in part according to rule sets imposed on individual agents as they interact with each other and their environment, adds a novel aspect to wagering game play that is not easily anticipated by individual players.

For the purposes of this document, an "agent" is defined as an autonomous module comprising software and/or hardware logic to execute a limited set of communication, movement, environmental sensing, and memory functions, perhaps including communication, movement, sensing, and storage hardware. An agent can be modeled as a set of rules comprising responses to stimuli. Examples of an agent include an insect (real or artificial), and an autonomous vehicle with a transceiver, a propulsion mechanism, wheels or wings, a programmed controller, and environmental sensors (e.g., to indicate distance to other agents, the direction of other agents, the temperature, the altitude, visibility, agent stamina, fuel remaining, agent location, objects visible to the agent, agent velocity, agent acceleration, etc.). Agents usually communicate indirectly (agent to environment to agent), but may also communicate directly in some embodiments (agent to agent). An agent may have more than one choice of action in response to a given local environment. The selection may be random, although some actions may be more probable than others. An agent module may comprise hardware, software, firmware, or a combination of these. Agents in a swarm may all operate using the same set of rules, and in some cases, one or more agents in the swarm (e.g., a swarm leader, or a group of drones) may operate using a different set of rules than the rest of the swarm. In some instances, each agent in a swarm may operate by its own set of rules. An agent may be sentient, without being sapient (i.e., self-aware).

A "swarm" is a population of agents interacting locally with one another and with their environment, leading to the emergence of global behavior over time. In addition to being containers for agents, swarms can themselves be agents. Hierarchical models can be built by nesting multiple swarms.

"Swarm intelligence" comprises the complex behaviors exhibited by a swarm of agents within an environment. These complex behaviors, used to complete a task, emerge from the swarm's ability to organize itself through the actions of the agents.

Several different algorithms have been developed to model swarm behavior. Three of the most common are now described.

Ant colony optimization (ACO) is a metaheuristic optimization algorithm used to find approximate solutions to combinatorial optimization problems. Using ACO, artificial ants build solutions by moving over a problem graph to mimic real ants, depositing artificial pheromones on the graph so that future artificial ants can build better solutions. While natural pheromones comprise a chemical substance that conveys information to and produces one or more specific responses in certain animals, artificial pheromones often take the form of messages and other information which, when made accessible by one agent, can be received for processing by other agents as a form of input to their logic, and perhaps used to alter the recipient's behavior. For examples of the use of pheromone objects and other forms of artificial pheromones, the reader is encouraged to refer to "The Design Of Multi-Agent Coordination And Control Systems Using Stigmergy," by Valckenaers et al., published in the Proceedings of the 3rd International Workshop on Emergent Synthesis at Bled, Slovenia (2001).

Particle swarm optimization (PSO) is a global optimization algorithm for problems having solutions represented as a point or surface in n-dimensional space. Hypotheses can be plotted in this space and seeded with an initial particle/agent velocity and an inter-particle/agent communication channel. Particles/agents then move through the solution space, evaluated according to a fitness criterion as time progresses. Over time, particles/agents accelerate towards other particles/agents within their communication grouping that have better fitness values.

Stochastic diffusion search (SDS) is an agent-based, probabilistic, global search and optimization technique used to solve problems where the objective function can be decomposed into multiple independent partial-functions. Each agent maintains a hypothesis that is iteratively tested by evaluating a randomly selected, partial objective function having parameters populated by the agent's current hypothesis. The partial function evaluations can be binary (e.g., an agent is either active or inactive). Information on hypotheses is diffused across the population via inter-agent communication. Unlike the stigmergic, indirect communication method of ACO, SDS agents can communicate hypotheses using a more direct, one-to-one communication strategy analogous to the tandem running procedure observed in ants. A positive feedback mechanism can be used to stabilize a population of agents about a global-best solution.

Each of these models can be used separately, or together, as explained below, to determine swarm behavior applied to wagering games. Readers that desire greater detail on various aspects of swarm behavior, including modeling, are encouraged to consult "Swarm Intelligence" by Russell C. Eberhart, et al., Morgan Kaufmann, 2001; and "Multiagent Systems: A Modern Approach to Distributed Artificial Intelligence" by Gerhard Weiss, The MIT Press, 2000.

Example Wagering Game Machine

FIG. 1 is a perspective view of a wagering game machine, according to example embodiments of the invention. Referring to FIG. 1, a wagering game machine 100 is used in gaming establishments, such as casinos. According to various embodiments, the wagering game machine 100 can be any type of wagering game machine, with varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc. Combinations of these types are also possible.

The wagering game machine 100 comprises a housing 112 and includes input devices, such as value input devices 118 and one or more player input devices 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information.

While only some components of the wagering game machine 100 are described in the following text in the interest of brevity and clarity, numerous other elements can exist and be used in any number or combination to create varying forms of the wagering game machine 100. Either of the displays 114, 116 can be used to display swarm behavior in conjunction with a wagering game.

Value input devices 118 can take any suitable form and can be located on the front of the housing 112. Value input devices 118 can receive currency and/or credits inserted by a player. Value input devices 118 can include coin acceptors for receiving coin currency and bill acceptors for receiving paper currency. Furthermore, value input devices 118 can include ticket readers and barcode scanners for reading information stored on vouchers, cards, and other tangible portable storage devices. Vouchers and cards may authorize access to central accounts, which can transfer money to the wagering game machine 100.

The player input devices 124 may comprise a plurality of push buttons on a button panel 126 for operating the wagering game machine 100. In addition, or alternatively, player input devices 124 can comprise a touch screen 128 mounted over the primary display 114 and/or the secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model (e.g., see FIG. 2), or workstation console model. Further, in some embodiments, the wagering game machine 100 may be include an attached chair assembly, as well as audio speakers designed to provide an enhanced audio environment. For example, a "surround sound" system may be included as part of the wagering game machine 100, perhaps integrated with the attached chair.

A player begins playing a basic wagering game by making a wager via the value input device 118. The player can initiate play by using the buttons of the player input device 124 or the touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 includes an information reader 152, which can include a card reader, ticket reader, bar code scanner, RFID transceiver, or computer readable storage medium interface. In some embodiments, the information reader 152 can be used to award complimentary services, restore game assets, track player habits, etc.

Example Portable Wagering Game Machine

Figure 2:
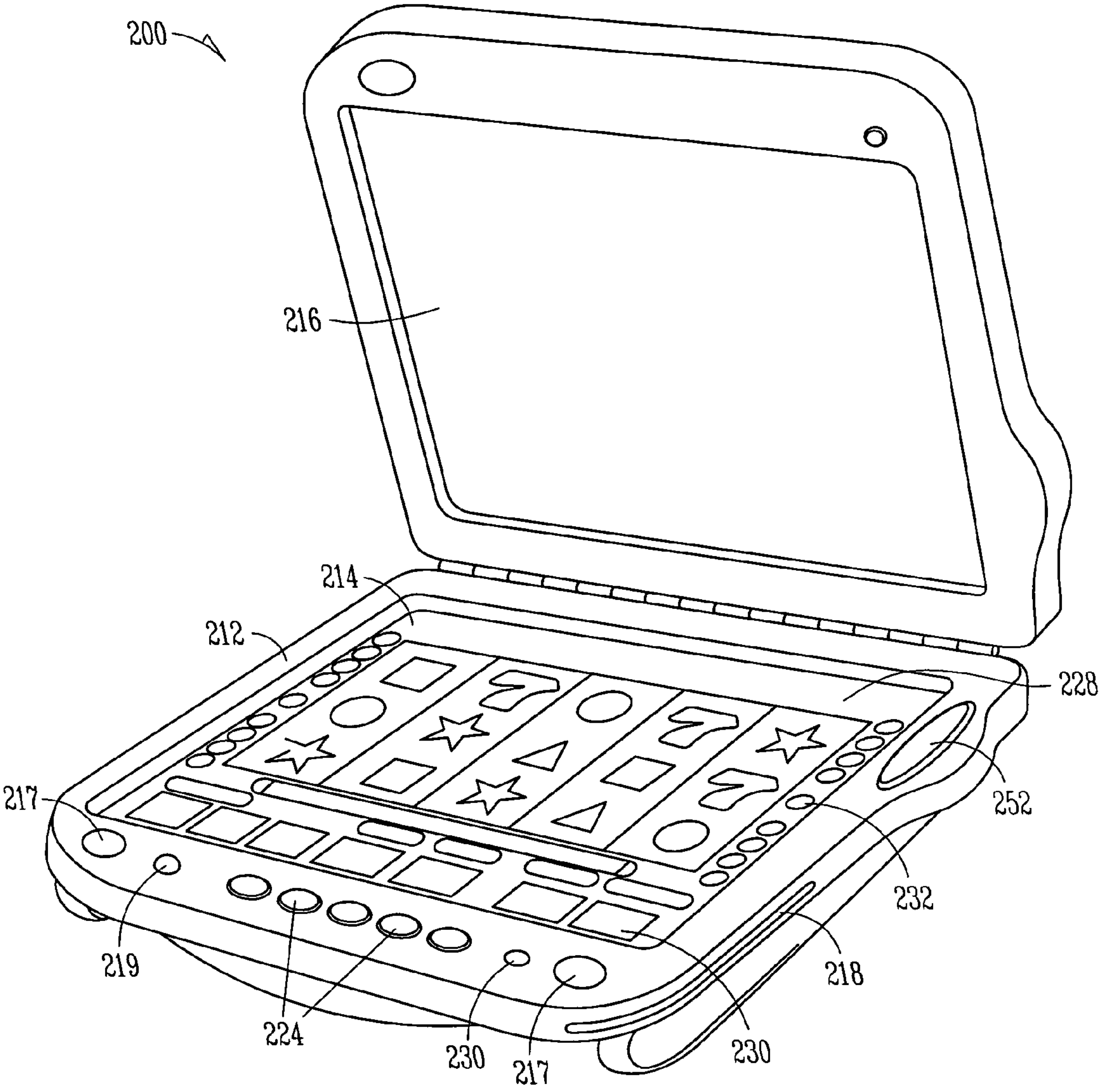
FIG. 2 is a perspective view of a portable wagering game machine according to an example embodiment.

FIG. 2 shows an example embodiment of a portable wagering game machine 200. The portable wagering game machine 200 can include any suitable electronic handheld or mobile device configured to play a video casino game such as blackjack, slots, keno, poker, blackjack, and roulette, among others. The wagering game machine 200 comprises a housing 212 and includes input devices, including a value input device

218 and one or more player input devices 224. For output, the wagering game machine 200 includes a primary display 214, and may include a secondary display 216, one or more speakers 217, one or more player-accessible ports 219 (e.g., an audio output jack for headphones, a video headset jack, etc.), and other conventional I/O devices and ports, which may or may not be player-accessible. In the embodiment depicted in FIG. 2, the wagering game machine 200 includes a secondary display 216 that is rotatable relative to the primary display 214. The optional secondary display 216 can be fixed, movable, and/or detachable/attachable relative to the primary display 214. Either the primary display 214 and/or secondary display 216 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, swarm behavior, and wagering game machine status.

The player-accessible value input device 218 can comprise, for example, a slot located on the front, side, or top of the casing 212 configured to receive credit from a stored-value card (e.g., casino card, smart card, debit card, credit card, etc.) inserted by a player. The player-accessible value input device 218 can also comprise a sensor (e.g., an RF sensor) configured to sense a signal (e.g., an RF signal) output by a transmitter (e.g., an RF transmitter) carried by a player. The player-accessible value input device 218 can also or alternatively include a ticket reader or barcode scanner for reading information stored on a credit ticket, a card, or other tangible portable credit or funds storage device. The credit ticket or card may authorize access to a central account, which can transfer monetary value to the wagering game machine 200.

Still other player-accessible value input devices 218 can make use of touch keys 230 on the touch-screen display (e.g., primary display 214 and/or secondary display 216) or player input devices 224. Upon entry of player identification information and, possibly, secondary authorization information (e.g., a password, PIN number, stored value card number, predefined key sequences, etc.), the player can be permitted to access his account. As one potential optional security feature, the wagering game machine 200 can be configured to permit a player to only access an account the player has specifically set up for the wagering game machine 200. Other conventional security features can be utilized to, for example, prevent unauthorized access to a player's account, to minimize the impact of any unauthorized access to a player's account, or to prevent unauthorized access to any personal information or funds temporarily stored on the wagering game machine 200.

The player-accessible value input device 218 may comprise a biometric player information reader which permits the player to access available funds on a player's account, either alone or in combination with another of the aforementioned player-accessible value input devices 218. In an embodiment wherein the player-accessible value input device 218 comprises a biometric player information reader, transactions such as value input to the wagering game machine 210, transferring value from one player account or source to an account associated with the wagering game machine 200, or executing another transaction, for example, could all be authorized via biometric reading, which might comprise a plurality of biometric readings, from the biometric device.

Alternatively, to enhance security, a transaction can be optionally enabled only by a two-step process in which a secondary source confirms the identity indicated by a primary source. For example, a player-accessible value input device 218 comprising a biometric player information reader can request a confirmatory entry from another biometric player information reader 252, or from another source, such as a credit card, debit card, player ID card, fob key, PIN number, password, hotel room key, etc. Thus, a transaction may be enabled by a combination of personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 218 can be provided and operated remotely from the wagering game machine 210.

The player input devices 224 may comprise a plurality of push buttons on a button panel for operating the wagering game machine 200. In addition, or alternatively, the player input device 224 can comprise a touch screen mounted to the primary display 214 and/or secondary display 216. In one aspect, the touch screen is matched to a display screen having one or more selectable touch keys 230 selectable by touching the associated area of the screen using a finger or a tool, such as a stylus pointer. A player can enable the desired function either by touching the touch screen at an appropriate touch key 230, or by pressing an appropriate push button on the button panel. The touch keys 230 can be used to implement the same functions as push buttons. Alternatively, the push buttons that form a portion of the player input devices 224 can provide input for one aspect of the operating the game, while the touch keys 230 can allow for input needed for another aspect of the game.

The various components of the wagering game machine 200 can be connected directly to, or contained within, the casing 212, as seen in FIG. 2, or can be located outside the casing 212 and connected to the casing 212 via a variety of wired (tethered) or wireless connection methods. Thus, the wagering game machine 200 can comprise a single, integral unit or a plurality of interconnected (e.g., using wireless connections) parts that can be arranged to suit a player's preferences.

The operation of the basic wagering game on the wagering game machine 200 is displayed to the player on the primary display 214. The primary display 214 can also display a bonus game associated with the basic wagering game. The primary display 214 can take the form of a high resolution liquid crystal display, a plasma display, a light emitting diode (LED) display or individual LEDs, or any other type of display suitable for use in the wagering game machine 200. The size of the primary display 214 can vary from, for example, about a 2-3" display to a 15" or 17" display. In at least some embodiments, the primary display 214 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, privacy screens, etc.). In at least some embodiments, the primary display 214 and/or secondary display 216 can have a 16:9 aspect ratio or other aspect ratio (e.g., 4:3). The primary display 214 and/or secondary display 216 can also each have different resolutions, different color schemes, and different aspect ratios.

A player typically begins play of the basic wagering game on the wagering game machine 200 by making a wager (e.g., via the value input device 218 or an assignment of credits stored on the portable wagering game machine 200 via the touch screen keys 230 or the player input device 224) on the wagering game machine 200. In some embodiments, the basic game can comprise a plurality of symbols arranged in an array, and includes at least one payline 232 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 218 of the wagering game machine 200 can double as a player information reader 252 that allows for player identification by reading a card with information indicating the player's identity (e.g., reading a player's credit card, player ID card, smart card, etc.). The player information reader 252 may alternatively or additionally comprise a bar code scanner, RFID transceiver, and/or computer readable storage medium interface. In one embodiment, the player information reader 252 comprises a biometric sensing device.

In some embodiments, a portable wagering game machine 200 can form part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

Figure 3:
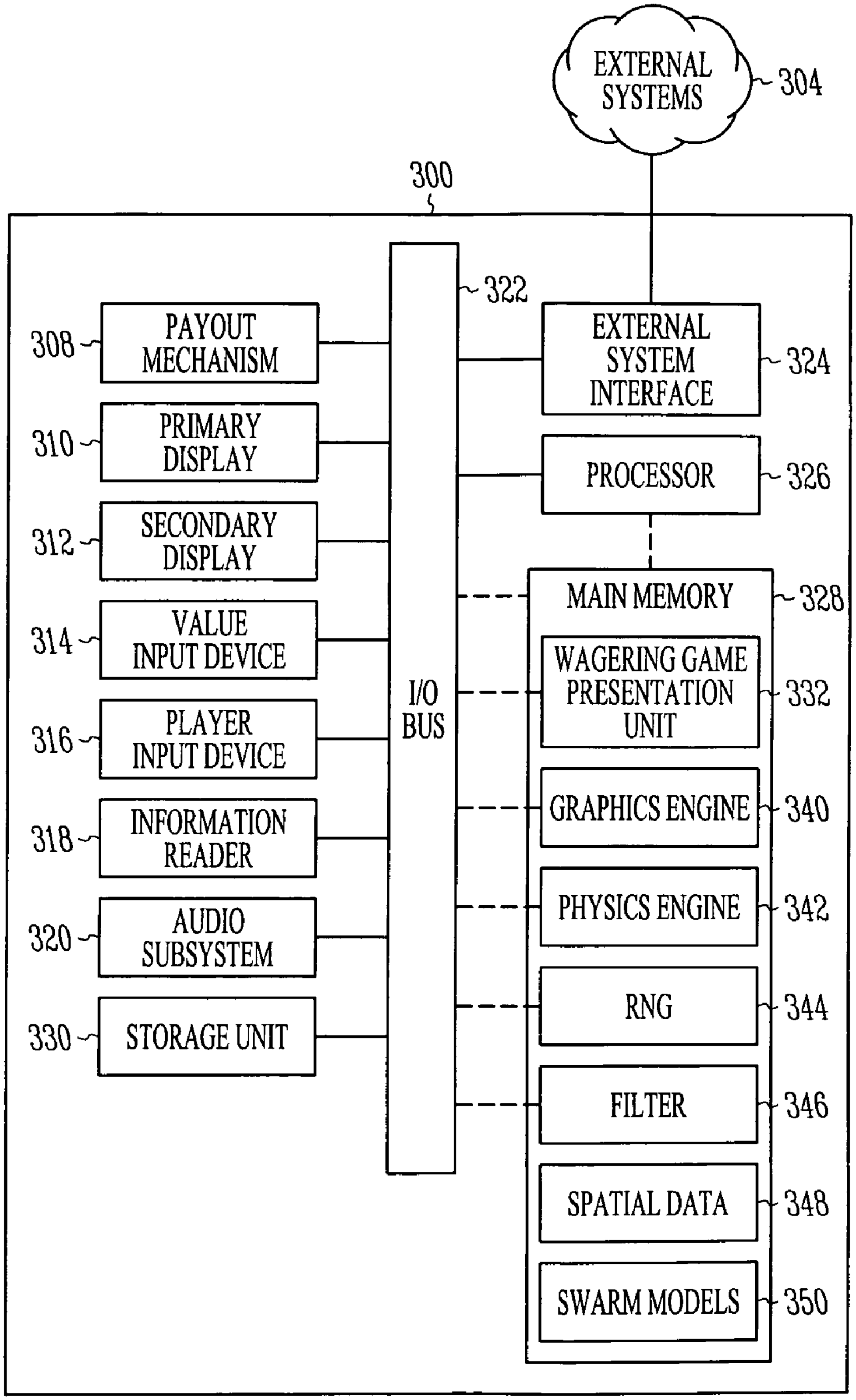
FIG. 3 is a block diagram of the architecture for a wagering game machine according to an example embodiment.

FIG. 3 is a block diagram illustrating the architecture 300 for a wagering game machine, according to an example embodiment. As shown in FIG. 3, the architecture 300 includes a processor 326 connected to main memory 328, which may include a wagering game presentation unit 332 and a graphics engine 340. The memory 328 may be coupled directly to the processor 326, to an input/output (I/O) bus 322, or both. In one embodiment, the wagering game presentation unit 332 can present wagering games, such as video poker, video black jack, video slots, video lottery, etc., in whole or in part.

Graphics engine 340 includes components that can be used to provide a real-time, three-dimensional rendering of three-dimensional space based on spatial and player input data. A number of graphics engines are known in the art and may be used in various embodiments of the invention. In some embodiments, the graphics engine comprises a RenderWare graphics engine, available from Criterion Software. As shown in FIG. 3, the wagering game presentation unit 332 and the graphics engine 340 may be implemented in software, hardware, or a combination of software and hardware. As such, the wagering game presentation unit 332 and the graphics engine 340 may be wholly contained within memory 328, or exist as separate units coupled to the I/O bus 322.

In some embodiments, the graphics engine 340 provides a set of one or more components that provide real-time, three dimensional computer graphics for a wagering game application and other software running on a wagering game machine. The graphics engine 340 may also be referred to as a game engine. In some embodiments, the graphics engine 340 provides an underlying set of technologies in an operating system-independent manner, so that a wagering game may be easily adapted to run on multiple platforms, including various hardware platforms, such as stand-alone and portable wagering game machines, as well as various software platforms, including the Linux®, UNIX®, Mac® OS X and Microsoft® Windows® families of operating systems.

In some embodiments, the graphics engine 340 may include various combinations of one or more components such as a rendering engine ("renderer") for two dimensional or three dimensional graphics. A physics engine 342 and/or other components (e.g., an artificial intelligence engine) may also be coupled to the I/O bus 322 so as to provide collision detection, sound, scripting, animation, artificial intelligence, networking, and scene graphs. Either one or both of the physics engine 342 and artificial intelligence engine (not shown) may be employed separately, or form an integral part of the graphics engine 340. A scene graph is generally considered to be an object-oriented representation of a three dimensional game world and is designed for efficient rendering of vast virtual worlds. Thus in various embodiments, real-time rendering of a three-dimensional model such as a scene graph is provided for a wagering game application or other software operating on a wagering game machine.

The components described above may be implemented in various combinations of software, hardware and/or firmware. Further, while shown as part of an architecture 300 for a wagering game machine, graphics engine 340 or portions thereof may reside on systems external to the wagering game machine, such as on a wagering game server.

In some embodiments, the components of graphics engine 340 may be replaced or extended with more specialized components. For example, in particular embodiments, the graphics engine 340 may be provided as a series of loosely connected components that can be selectively combined to create a custom graphics engine for selected wagering game applications.

As noted above, various components may be present in a graphics engine 340. Some graphics engines provide real-time, three-dimensional rendering capabilities while other components outside of the graphics engine 340 provide other functionality used by wagering games. These types of graphics engines 340 may be referred to as a "rendering engine," or a "3D engine".

In some embodiments, the graphics engine 340 may utilize and be designed substantially in accordance with various versions of a graphics applications interfaces (APIs) such as Direct3D® or OpenGL® APIs which provide a software abstraction of a graphics processing unit or video card. Further, in some embodiments, low-level libraries such as the DirectX®, SDL (Simple DirectMedia Layer), and OpenAL® libraries may also be used in presenting a wagering game in order to provide hardware-independent access to other computer hardware such as player input devices (e.g., mouse, keyboard, and joystick) 316, network cards (perhaps in the form of an external system interface 324), and sound cards (perhaps forming part of an audio subsystem 320).

The processor 326 can also be connected to an I/O bus 322, which facilitates communication between the wagering game machine's components. The I/O bus 322 may be connected to one or more of a payout mechanism 308, primary display 310, secondary display 312, value input device 314, player input device 316, information reader 318, storage unit 330, and a random number generator (RNG) 344. The player input device 316 can include the value input device 314 to the extent the player input device 316 is used to place wagers. The I/O bus 322 may also be connected to an external system interface 324 (e.g., wired or wireless network interface), which is connected to external systems 304 (e.g., wagering game networks, such as network 400 of FIG. 4).

The processor 326 can be configured to model swarm behavior, and the displays 310, 312 can be used to display swarm behavior. The player input device 316, the information reader 318, a player input filter 346, and three-dimensional spatial data 348 can be used to influence swarm behavior, providing inputs to one or more swarm models 350, which may be included in the memory 328, or downloaded to the memory 328 via the external system interface 324. A physics engine 342, the RNG 344, the filter 346, and spatial data 348 may also be used to influence swarm behavior. Swarm behavior can also be modeled elsewhere, and recorded, so that pre-recorded swarm behavior scenarios can be stored on the storage unit 330 for playback to the player of the wagering game machine at selected times.

As is the case for the wagering game presentation unit 332 and the graphics engine 340, the physics engine 342, the RNG 344, the player input filter 346, spatial data 348, and the swarm models 350 may be wholly contained in the memory 328 as software, or coupled to the I/O bus as hardware or firmware modules.

Some embodiments of the invention include an audio subsystem 320. Audio subsystem 320 provides audio capabilities to the wagering game machine and may comprise a sound card and/or an audio amplifier coupled to speakers or an audio jack, and may further include an audio programming source stored in a memory such as a compact disk (CD), digital video disk (DVD), flash memory, etc.

In some embodiments, the wagering game machine architecture 300 includes additional peripheral devices and/or more than one of each component shown in FIG. 3. For example, in some embodiments, the wagering game machine architecture 300 includes multiple external system interfaces 324 and multiple processors 326. In some embodiments, any of the components can be integrated or subdivided. Additionally, in some embodiments, the components of the wagering game machine architecture 300 can be interconnected according to any suitable interconnection architecture (e.g., directly connected, serially connected, parallel connections, hypercube, etc.).

In many embodiments, any of the components of the wagering game machine architecture 300 (e.g., the wagering game presentation unit 332 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use portions of the wagering game machine architecture 300 to activate wagering game play on a wagering game machine. Using the available input mechanisms, such as value input device 314, and/or devices coupled through the player input device 316, the player may select any variables associated with the wagering game and place a wager to purchase a play of the game. In game play, the processor 326 can generate one or more random events using the RNG 344 to provide an award to the player for a winning outcome of the random event. Alternatively, random events may be generated by a remote computer using an RNG 344 or pooling schema and then transmitted to the wagering game machine. The processor 326 operates the display 114 to represent the random events and outcomes in a visual form that can be understood by the player. In some embodiments, a wagering game segment may be triggered based on certain events. For example, a bonus round may be triggered.

Thus, a variety of embodiments may be realized. For example, referring now to FIGS. 1-3, it can be seen that in some embodiments, a wagering game machine apparatus 300 comprises a graphics engine 340 operable to generate an initial image including a subset of a swarm in a space representing a portion of a wagering game upon which monetary value may be wagered. The apparatus 300 may also comprise a processor 326 operable to present the wagering game and to determine the actual outcome of the wagering game based on a player input indication (e.g., perhaps provided by the player input device 316), swarm behavior modeling, and a selected statistical game outcome, wherein the graphics engine 340 is operable to generate an updated image derived from the initial image and the actual outcome. Thus, in many embodiments, the apparatus 300 includes one or more player input devices 316 to provide the player input indication.

In most cases, the player input devices 316 will include at least one primary input device, or a device used more often than others. Any player input device 316 may comprise the primary device, such as a keyboard, a touch screen, a joystick, a wireless wand, a cellular telephone, a trackball, a camera, a gesture sensor, a microphone, a spring-loaded plunger (e.g., the type of plunger used to launch a ball in pinball games), a button having adjustable tactile characteristics (e.g., depression weight, depression travel, and vibration feedback), a thumbwheel, a musical instrument, a dance pad, and a brain wave sensor (e.g., an electroencephalograph sensor).

The RNG 344 may be included in the apparatus 300, and be used in a number of ways, some described above. In addition, the RNG 344 may be used to provide a basis to modify one or more of a player input indication (provided by the player input device 316), an attribute of some agents in the swarm (e.g., some agents operate as drones, some as worker bees, and one as the queen), a swarm behavior rule (all swarm members are attracted to honey, and all fly away from poison), a display time associated with swarm behavior (e.g., swarm behavior is exhibited for a selected amount of time, unless and until player input is indicated), and an environmental variable associated with the space (e.g., density of the spatial environment, perhaps modeling tunneling through the earth, flying in air, swimming in water, or rocketing through free space).

In some embodiments, the displays 310, 312 can be used to display animations of various types. For example, the apparatus 300 may include a display to display a first animation of swarm behavior based on swarm behavior modeling, and a second animation of path-finding behavior associated with agents in the swarm (e.g., swarm agents operate as a swarm for some first defined period of time, and then as individual elements following pre-defined paths for a second defined period of time).

The player input device 316 may be operated so as to provide direct inputs to swarm models 350, or the player input indications provided by the device 316 may be filtered, such that a filter 346 is used to limit wagering game input activity to those player input indications that exceed some preselected threshold. For example, a button might have to be pressed at least halfway before the player input is accepted, or pressed twice within a time period of one second, or a touch panel might be rendered insensitive to player input activity with less than 10 n-m of force.

The use of multiple wagering game machines will now be described with respect to networks, including wagering game networks and wagering game servers.

Figure 4:
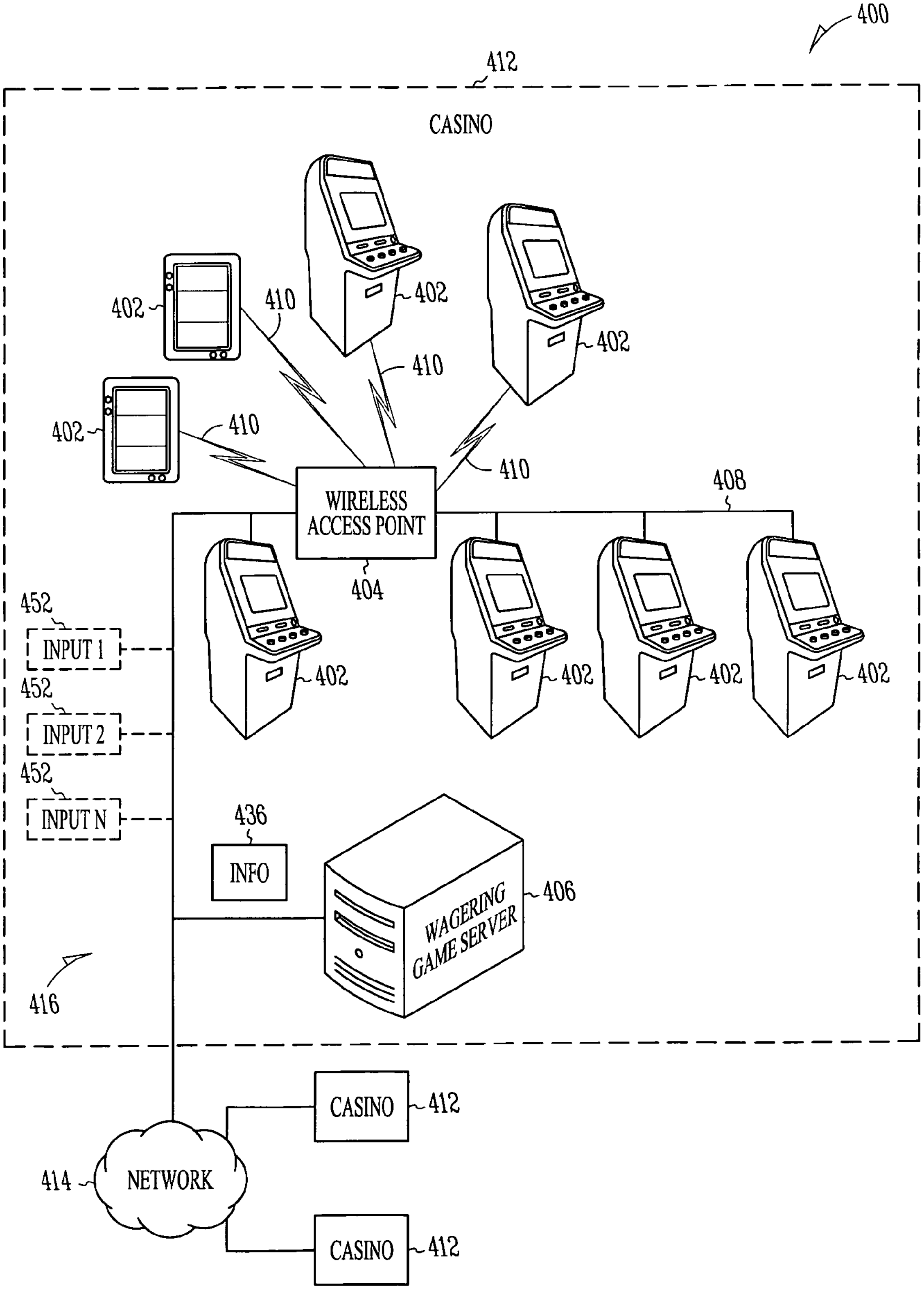
FIG. 4 is a block diagram illustrating a wagering game network and system according to an example embodiment.

FIG. 4 is a block diagram illustrating a wagering game network and system 400 according to an example embodiment. As shown in FIG. 4, the wagering game system 400 includes a plurality of casinos 412 connected to a communications network 414.

Each of the plurality of casinos 412 includes a local area network 416, which may include a wireless access point 404, wagering game machines 402, and a wagering game server 406 that can serve wagering games over the local area network 416. As such, the local area network 416 includes wireless communication links 410 and wired communication links 408. The wired and wireless communication links 408, 410 can employ any suitable connection technology, such as Bluetooth™, Institute of Electrical and Electronics Engineers (IEEE) 802.11 Ethernet, public switched telephone networks, SONET, etc. In some embodiments, the wagering game server 406 can serve wagering games and/or distribute content to devices located in other casinos 412 or at other locations on the communications network 414. The wagering game machines 402 and wagering game server 406 can include hardware and machine-readable media including instructions for performing the operations described herein.

The wagering game machines 402 described herein can take any suitable form, such as floor standing models, portable units, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In some embodiments, the wagering game system 400 can include other network devices, such as accounting servers, wide area progressive servers, player tracking servers, and/or other devices suitable for use in connection with embodiments of the invention. In any embodiment, the wagering game machines 402 may be similar to or identical to the wagering game machine 100 of FIG. 1, 200 of FIG. 2, including some or all of the elements shown with respect to the architecture 300 of FIG. 3.

In various embodiments, wagering game machines 402 and wagering game servers 406 work together such that a wagering game machine 402 may be operated as a thin, thick, or intermediate client. For example, one or more elements of game play may be controlled by the wagering game machine 402 (client) or the wagering game server 406 (server). Game play elements may include executable game code, lookup tables, configuration files, game outcome, audio or visual representations of the game, game assets, swarm behavior models, spatial data, and the like.

In a thin-client example, the wagering game server 406 may perform functions such as determining game outcome and managing assets, while the wagering game machine 402 may be used merely to present the graphical representation of such outcome or asset modification to the user (e.g., player). In a thick-client example, game outcome may be determined locally (e.g., at the wagering game machine 402) and then communicated to the wagering game server 406 for recording or managing a player's account. Game outcomes, credits, awards, and other information 436 may be exchanged by communicating it to players via tangible objects (e.g., tickets or cards) dispensed by printers and/or dispensing apparatus (not shown) coupled to the machines 402, servers 406, or the network 416. Information 436 may be received from the players using the tangible objects, perhaps acquired via readers (e.g., readers 318 in FIG. 3) and/or a variety of input devices 452 (e.g., player input devices) coupled to the machines 402, servers 406, or the network 416.

Functionality not directly related to game play may be controlled by the wagering game machine 402 (client) or the wagering game server 406 (server) in various embodiments. For example, power conservation controls that manage a display screen's light intensity may be managed centrally (e.g., by the wagering game server 406) or locally (e.g., by the wagering game machine 402). Other functionality not directly related to game play may include presentation of advertising, software or firmware updates, system quality or security checks, etc.

Thus, still further embodiments may be realized. For example, a wagering game system 400 may comprise a first wagering game machine 402 having a graphics engine to generate an initial image including a swarm in space representing a portion of a wagering game upon which monetary value may be wagered, and a processor operable to present the wagering game and to determine the actual outcome of the wagering game based on a player input indication, swarm behavior modeling, and a selected statistical game outcome, wherein the graphics engine is operable to generate an updated image derived from the initial image and the actual outcome.

The system 400 may also comprise a second wagering game machine 402 including a primary input device 452 to provide the player input indication. In this type of system, players on different wagering game machines 402 can interact across networks 414, 416.

Some systems 400 may include one or more wagering game machine servers 406 to couple to the first and the second wagering game machines. The servers 406 can be used to present a progressive gaming environment based on the actual outcome. Indeed, a system 400 may include a plurality of player input devices 452 coupled to the first and the second wagering game machines, wherein the player input indication to a selected wagering game is provided as a combination of the indications from a plurality of input devices 452.

In some embodiments, one or more swarms may operate to travel from one wagering game machine to another within a networked environment, perhaps with continued movement until a winner is revealed. The concept might be used to display the resultant winner of a community game in some instances. For example, in a progressive gaming environment, a swarm of bees might move faster and faster, and/or get louder and louder while moving from machine to machine until they finally are shown at a selected player's wagering game machine display as a way of indicating that particular player has won the progressive series. In these cases, each agent in the swarm would be operating on only one wagering game machine at a time, while swarm travel would be permitted to any of the machines forming part of a selected bank of machines.

Example Wireless Environment

In some embodiments, the wireless access point 404 can be part of a communication station, such as wireless local area network (WLAN) communication station including a Wireless Fidelity (WiFi) communication station, or a WLAN access point (AP). In these embodiments, the wagering game machines 402 can be part of a mobile station, such as WLAN mobile station or a WiFi mobile station.

In some other embodiments, the wireless access point 404 can be part of a broadband wireless access (BWA) network communication station, such as a Worldwide Interoperability for Microwave Access (WiMax) communication station, as the wireless access point 404 can be part of almost any wireless communication device. In these embodiments, the wagering game machines 402 can be part of a BWA network communication station, such as a WiMax communication station.

In some embodiments, any of the wagering game machines 402 can be part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 404 and the wagering game machines 402 can communicate via radio frequency (RF) signals in accordance with specific communication standards, such as the IEEE standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some broadband wireless access network embodiments, the wireless access point 404 and the wagering game machines 402 can communicate via RF signals in accordance with the IEEE 802.16-2004 and the IEEE 802.16(e) standards for wireless metropolitan area networks (WMANs) including variations and evolutions thereof. However, they can also be suitable for transmitting and/or receiving communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 404 and the wagering game machines 402 can communicate in accordance with standards such as the Pan-European mobile system standard referred to as the Global System for Mobile Communications (GSM). In some embodiments, the wireless access point 404 and the wagering game machines 402 can also communicate in accordance with packet radio services such as the General Packet Radio Service (GPRS) packet data communication service. In some embodiments, the wireless access point 404 and the wagering game machines 402 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0 March 2000). In some of these embodiments, the wireless access point 404 and the wagering game machines 402 can provide packet data services (PDS) utilizing packet data protocols (PDP). In other embodiments, the wireless access point 404 and the wagering game machines 402 can communicate in accordance with other standards or other air-interfaces including interfaces compatible with the enhanced data for GSM evolution (EDGE) standards (see 3GPP Technical Specification, Version 3.2.0 March 2000).

In some embodiments, the wireless access point 404 and the wagering game machines 402 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. In other embodiments, the wireless access point 404 and the wagering game machines 402 can communicate in accordance with an ultra-wideband (UWB) communication technique where a carrier frequency is not used. In other embodiments, the wireless access point 404 and the wagering game machines 402 can communicate in accordance with an analog communication technique. In other embodiments, the wireless access point 404 and the wagering game machines 402 can communicate in accordance with an optical communication technique, such as the Infrared Data Association (IrDA) standard. In some embodiments, the wireless access point 404 and the wagering game machines 402 can communicate in accordance with the Home-RF standard which can be in accordance with a Home-RF Working Group (HRFWG) standard.

Figure 5A:
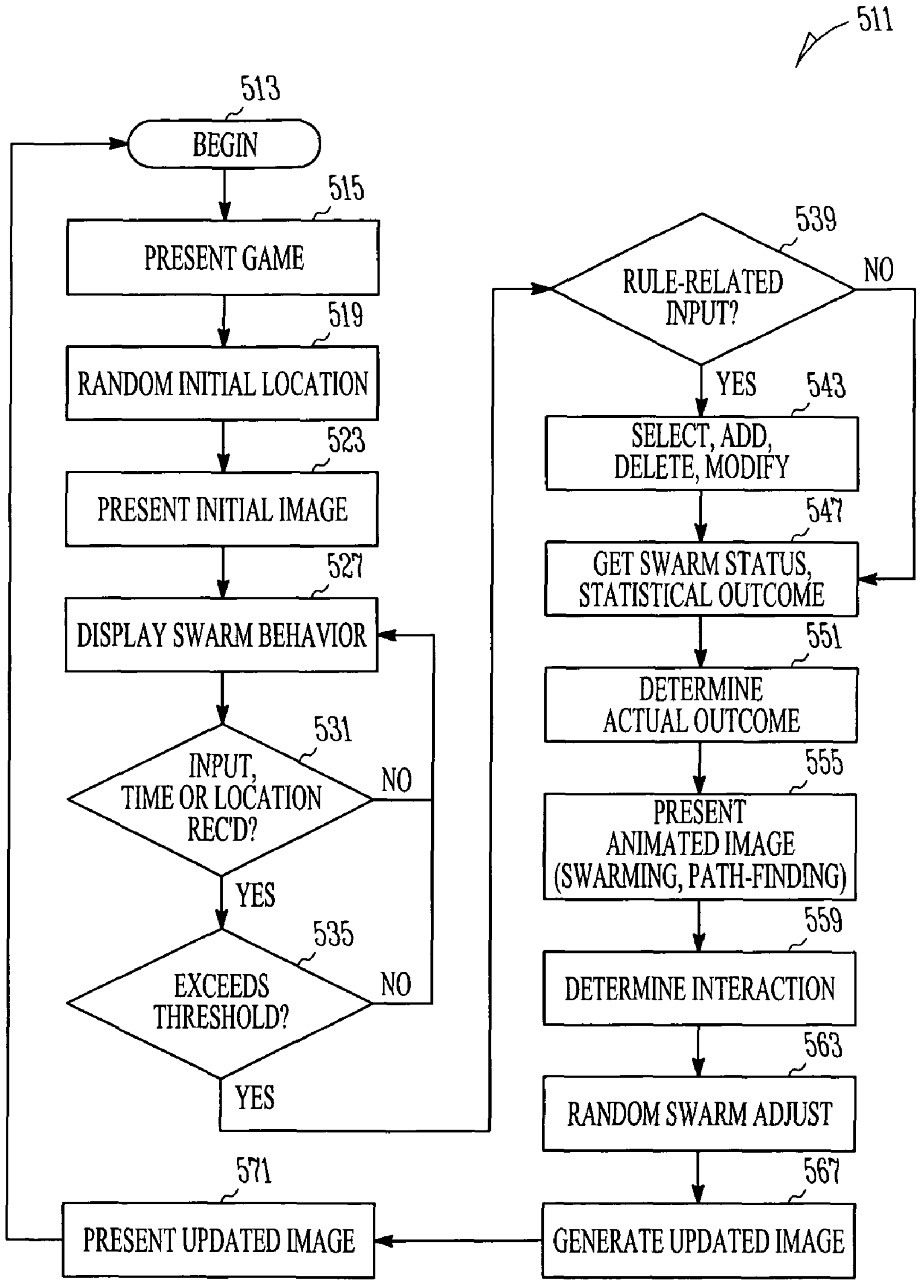
FIGS. 5A and 5B are flowcharts illustrating a variety of methods according to example embodiments.
Figure 5B:
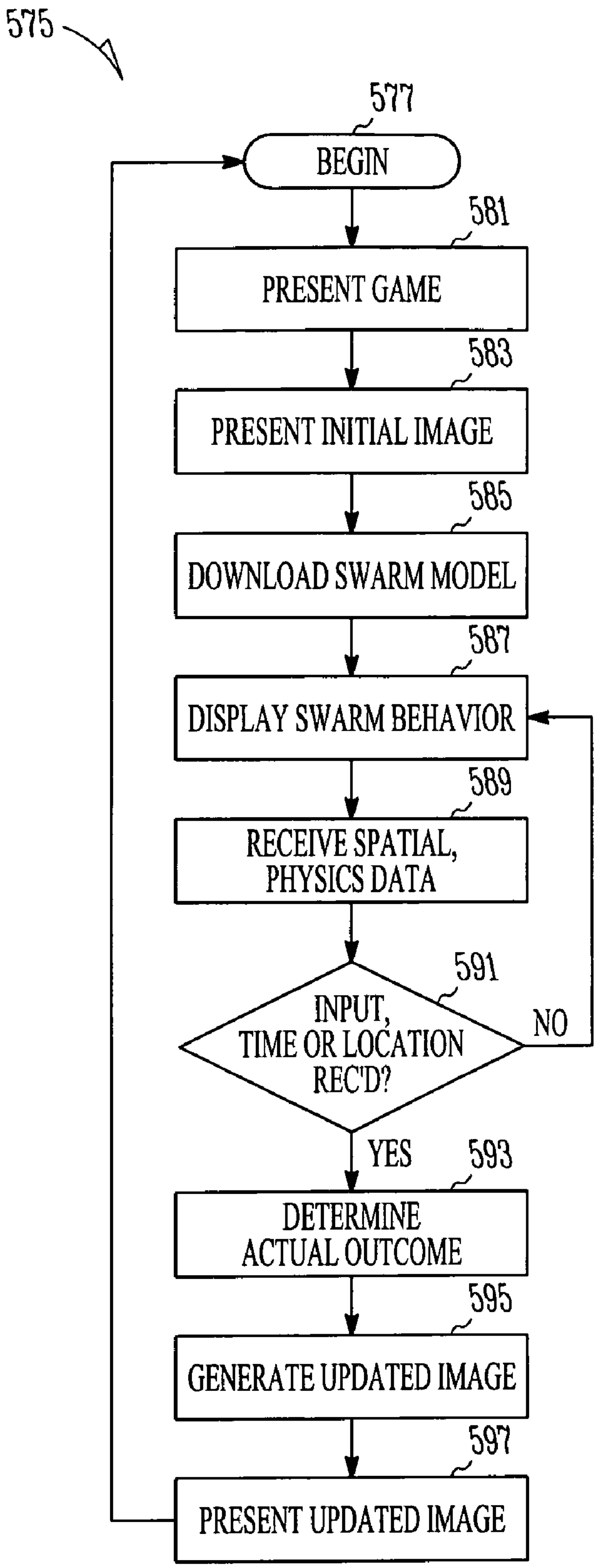

FIGS. 5A and 5B are flowcharts illustrating a variety of methods 511, 575 according to example embodiments. The methods 511, 575 enable the presentation of wagering games in conjunction with swarm behavior. The methods may be performed in conjunction with an operating environment comprising computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods 511, 575 illustrated in FIGS. 5A and 5B include acts that may be taken by an operating environment executing an exemplary embodiment of the invention.

Thus, in some embodiments, a method of presenting a wagering game in conjunction with swarm behavior begins at block 513, which may occur before or after activating a bonus round, and continues on to block 515 with presenting a wagering game upon which monetary value may be wagered. The wagering game may comprise any type of game, including combat games, sports games, board games, and casino games, as well as combinations of these.

Among others, combat games include hand-to-hand combat games, hand-held weapons games, firearms games, land battle games, aerial battle games, and sea battle games, as well as combinations of these. Among others, sports games include track, football, soccer, basketball, hockey, bowling, racing, darts, sculling, cycling, sculling, tennis, skating, and combinations of these. Among others, casino games comprise roulette games, craps games, slots games, wheel of fortune games, and card games, as well as combinations of these.

The method 511 may continue at block 519 with randomly determining the initial location of a swarm. The method 511 may then include presenting an initial image including a subset of the swarm in space (e.g., two- or three-dimensional space) representing a portion of the wagering game at block 523. Swarms may comprise two or more two- and/or three-dimensional objects representing one or more of agents, humans, animals, insects, vehicles, targets, numbers, game-playing pieces, and player-created entities (e.g., some kind of creature or avatar created specifically for a selected game).

As the initial image for a wagering game is presented, in some embodiments, the image represents a continuously updated view of movement through a three-dimensional space from the view of a point of reference calculated using an input data model and a graphics engine that processes the data model to produce the view. In some embodiments, the image represents a flight of an airplane. In alternative embodiments, the image represents the view of a car driving down one or more lanes of a street. It should be noted that various embodiments are not limited to any particular model.

Additionally, the image may contain graphical objects representing targets or other objects in the scene. In some embodiments, the targets may comprise bonus award amounts or bonus multipliers. In addition, the graphical objects may include graphical elements that are part of the bonus round such as airplanes, cars, or other parts of the scenes provided in a bonus round. The graphical objects may be fixed in the space or they may move through the space.

In some embodiments, the method 511 includes displaying swarm behavior at block 527, based on swarm behavior modeling, until either a player input indication is received, a preselected time period has elapsed, or a location of the swarm substantially matches some statistically desired location (e.g., a swarm of bees has been drawn to a hive, or a swarm (school) of fish has reached a desirable feeding ground, or a swarm (flock) of birds has landed on a particular building—each convergence point associated with a selected monetary award) as determined at block 531.

A graphical object representing a user (e.g. an avatar) or an object under the control of a user (e.g., a car, plane, animal, or sporting implement) may move or be moved through the environment. For example, the environment may be a set of streets within a city, a cave, an airspace, an ocean, free space, or any other environment. A car with movements controlled by the user may interact with other cars in the environment, or a plane controlled by the user may be flown through airspace as part of a squadron, for example. Such movement may be indicated by player input received at the wagering game machine.

If an indication of player input is received at block 531, then the method 511 may include filtering the input at block 535 to determine whether it exceeds some desired threshold (e.g., the player's avatar in a shooting game achieves some desired degree of accuracy), as explained previously. Thus, the method 511 may include filtering the player input indication to include only wagering game actions that are less than, meet, or exceed a preselected threshold.

For example, in some embodiments, a button may be pressed indicating a plane is to bank left, bank right, climb, or dive. In alternative embodiments, a button may be pressed indicating that a car is to change lanes, or a joystick manipulated to indicate that an avatar is to move in a selected direction. The input may be received from a button on a button panel, a button icon on a touch screen, or from any other type of input device (e.g., a wired or wireless remote control, including the Wii™ remote control device available from Nintendo of America, Inc. in Redmond, Wash.

The method 511 may then go on to determine whether the indication of player input is associated with attraction or some other rule for swarm behavior at block 539, and take some action in response at block 543. Thus, the method 511 may include selecting a swarm attraction element (e.g., selecting a particular hive among several with respect to a swarm of bees) indicated by the player input at block 539, and modifying a swarm attraction value associated with the swarm attraction element (e.g., making entry into the selected hive worth $10 instead of $5) responsive to the player input indication at block 543. The method 511 may also include taking the player input indication as one that operates to modify an attribute of an agent in the swarm at block 539, and then adding, eliminating, or modifying one or more swarm behavior rules (e.g., turning a group of agents from entities that are attracted to water to a group that is repelled by it) responsive to the player input indication at block 543.

In some embodiments, the method 511 includes at block 547 obtaining some status indication of the swarm (e.g., alive, dead, sick, weak, within range of a target, above or below a selected altitude, etc.), as well as a desired statistical outcome for the wagering game. The method 511 may go on to block 551 with determining the actual outcome of the wagering game based on one or more player input indications, swarm behavior modeling, and the selected statistical game outcome at block 551.

The selected statistical game outcome (e.g., player win probability set to equal some defined percentage) can be used to vary behavior associated with the swarm to provide modified swarm behavior, and the modified swarm behavior can be used to derive the actual outcome. Indeed, a wide variety of conditions can be imposed on swarm behavior to determine the actual outcome.

For example, one or more of swarm democratic behavior, individual agent behavior, cumulative agent behavior, agent tipping point behavior, time-based agent behavior, agent achievement behavior, agent location, agent development, and agent-environment effect can be used to derive the actual outcome. Swarm democratic behavior means that one outcome is determined by the decision of the largest portion of the swarm (e.g., out of ten bees, one goes in the $10 hive, two go in the $5 hive, and seven go in the $8 hive. In that case, $8 is awarded). Individual agent behavior means that each member of the swarm can determine a prize. Thus, with ten bees going to the same hives as above, $76 is awarded (1×$10+2×$5+7×$8=$10+$10+$56=$76). Cumulative agent behavior is similar to what occurs with individual agent behavior, except that prizes vary each time an agent creates an outcome (e.g., each time a hive prize is awarded, it doubles for the next bee to enter the hive). Tipping point behavior is similar to what occurs with cumulative agent behavior, except that prizes are only awarded if the number of agents performing an action exceeds a selected threshold (e.g., $10 is awarded every time 5 bees enter a hive, with $0 for any other number). Time-based agent behavior means that the duration of an agent or swarm action determines the result (e.g., $1 might be awarded for every second a bee gathers pollen inside a flower, with the total prize being $1 times the total number of seconds all bees gather pollen inside flowers). Agent achievement behavior means that a prize is awarded for every agent in the swarm who achieves some goal (e.g., bees must fly past a fly swatter—every bee that survives is given $1). Agent location means that at a certain point during the presentation of the wagering game, a snapshot is taken of the playing field. The prize is based on the location of every agent in the swarm (e.g., every bee in a hive awards $5, and bees out of hives award $1). Agent development means that agents of the swarm are affected by the environment in a way that changes their type or the rules guiding their behavior. The prize is based on the status of each agent in the swarm (e.g., bees who pass through a gold hive turn to gold. Every normal bee awards $1, every golden bee awards $5). Agent-environment effect means that agents in the swarm have an effect on their environment. At a set point in time, the prize is determined by the state of the environment (e.g., bees take pollen from flowers. After 30 seconds, $1 is awarded for every untouched flower, $5 is awarded for every partially harvested flower, and $10 is awarded for every completely harvested flower). All these conditions can be combined to add to the variety of game play.

In some embodiments, the method 511 includes at block 555, presenting a preselected animated image based on swarm behavior modeling after presenting the initial image at block 523, and prior to displaying an updated image at block 571. Displaying swarm behavior associated with or based on swarm behavior modeling may thus be accomplished by selecting an animation from a set of pre-recorded swarm animations, perhaps previously conducted on a separate processor or workstation, and stored in the wagering game machine memory, on a compact disk, in a flash memory, or on a wagering game server.

In addition, or alternatively, the method 511 may include, prior to displaying the updated image at block 571, displaying a first animation of swarm behavior based on swarm behavior modeling, and displaying a second animation of path-finding behavior associated with agents in the swarm at block 555. Examples of path-finding behavior include the activities of guest run patterns exhibited in the Grand Hotel® wagering game by WMS Gaming Inc., as described in United States Patent Publication No. 2005/0049029 incorporated herein by reference in its entirety.

In some embodiments, the method 511 may include determining an interaction between the swarm and some object, such as fluid forming a portion of three-dimensional space at block 559, and then presenting the interaction as a visible portion of the updated image presented at block 571. The method 575 may then include returning to block 513. At any selected time, swarm behavior associated with some agents in the swarm may be adjusted by a random amount at block 563.

At block 567, the method 511 includes generating an updated image derived from the initial image and the actual outcome of the wagering game, and then presenting the updated image at block 571. Modified swarm behavior (via player input indications, desired statistical outcomes, random input, etc.) can then be presented as a visible portion of the updated image.

The method 511 may also include using the selected statistical game outcome to vary the player input indication to provide a modified player input indication. Original and modified versions of the player input indication can also be displayed as a visible portion of the updated image at block 571. Other methods may be realized. For example, turning now to FIG. 5B, it can be seen that a method 575 may include beginning at block 577, presenting a wagering game upon which monetary value may be wagered at block 581, and presenting an initial image including a subset of a swarm in space representing a portion of the wagering game at block 583.

The method 575 may go on to include downloading a swarm model to be incorporated into determining the actual outcome at block 585, and displaying swarm behavior based on swarm behavior modeling until either an indication of player input is received, a preselected time period has elapsed, or the swarm location substantially matches a statistically desired location at block 587. In some embodiments, the method 575 may include receiving three-dimensional spatial data and/or data from a physics engine to determine one or more interactions between the swarm and at least one three-dimensional object in the space at block 598. The physics engine may be used in conjunction with movement along a path through the game space. Thus some aspects of the updated image may be scripted and other aspects may behave in accordance with the output of the physics engine.

If a player input indication is received, a selected time period has elapsed, or the swarm has reached a statistically desired location, then the method 575 may go on to include determining the actual outcome of the wagering game based on the player input indication, swarm behavior modeling, and the selected statistical game outcome at block 593. The method 575 may go on to include generating an updated image derived from the initial image and the actual outcome at block 595, and presenting the updated image to the game player at block 597. The method 575 may then operate to return to block 577.

Additionally, in some embodiments, apparatus and systems may operate to save the path a player takes during game play through the game space in order to provide an instant replay feature. Different camera angles, either automatically or under the control of a player, may be provided during the instant replay allowing the player to see different views of the original path. Further, the path that represents a best bonus round (e.g., a bonus round in which the player achieved their best score) may be saved, and perhaps used to represent a previous episode of an episodic bonus. The path may be saved on the player's wagering game machine, or it may be saved on a server so that the player may replay, or continue to play the bonus round on a different wagering game machine or on a personal computer.

Similar to saving a path, apparatus and systems may operate to automatically checkpoint or allow a player to checkpoint a path taken through the game space, so as to save the current state of the player's path while playing a selected game. The player may the return to the checkpointed position along the path and resume where the player left off.

In some embodiments, the player may be allowed to leave the chosen path altogether and return at a later point. For example, upon leaving the path, the environment may cease to be generated in a scripted manner and a physics engine may be used to simulate the interaction of objects being displayed. Swarm modeling and behavior may also be used to influence various interactions. For example, a physics engine may be used to simulate gravity, wind, object motion, and collisions between objects while the player is no longer on the path. Swarms may converge upon the player, accompany the player, or leave the player entirely alone. Upon returning to the path, the images may be rendered as described above. Various mechanisms may be used to determine 0that the player should be returned to the path, for example hitting target or the expiration of a timer may cause the player to return to a chosen path.

The path taken by a player through the game space may be used to script or partially script a bonus round of a wagering game. In some embodiments, one or more processors controlling the wagering game machine determine the total bonus amount that will be award during the bonus round prior to the display and execution of the bonus round. The targets or objects that appear along the path may be adjusted such that a predetermined bonus amount is selected. Alternatively, the bonus amounts that may be obtained along the path can be randomly generated and a final target or other graphical object may provide a final bonus amount so that the total amount awarded is equal to a predetermined amount. In some embodiments, apparatus and systems operate to determine which targets or other objects will contribute to the final bonus amount and dynamically change the amounts associated with various targets and other graphical objects such that the total amount awarded equals a predetermined bonus amount.

It should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Thus, other embodiments may be realized. For example, an article of manufacture, such as a computer, a memory system, a magnetic or optical disk, some other storage device, and/or any type of electronic device or system may include one or more processors coupled to a machine-readable medium such as a memory (e.g., removable storage media, as well as any memory including an electrical, optical, or electromagnetic conductor) having instructions stored thereon (e.g., computer program instructions), which when executed by the one or more processors result in performing any of the actions described with respect to the methods above.

CONCLUSION

Apparatus, systems and methods for presenting a wagering game in which a player navigates through space as presented on the display of a wagering game machine, augmented by artificial intelligence in the form of swarm behavior, have been described. Implementing the apparatus, systems, and methods disclosed herein may provide unexpected variety for gaming machine players via game play scenarios modified by swarm behavior.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

Some portions of the Detailed Descriptions are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of actions leading to a desired result. The actions are those involved in physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the discussion, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

The description of the various embodiments is to be construed as exemplary only and does not describe every possible instance of the invention. Numerous alternatives could be implemented, using combinations of current or future technologies, which would still fall within the scope of the claims. In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

presenting a wagering game upon which monetary value may be wagered;

presenting an initial image including a subset of a swarm in a space representing a portion of the wagering game;

determining an actual outcome of the wagering game based on a player input indication, a swarm behavior model and a selected statistical game outcome, wherein the swarm behavior model is selected from a plurality of predefined swarm behavior models, wherein each predefined swarm behavior model is to determine a prize value for the actual outcome based on behaviors of the subset of the swarm presented in the space; and generating an updated image derived from the initial image and the actual outcome.

2. The method of claim 1, wherein the wagering game comprises one of a combat game, a sports game, a board game, and a casino game.

3. The method of claim 1, wherein the selected statistical game outcome is used to vary behavior associated with the swarm to provide modified swarm behavior, and wherein the modified swarm behavior is used to derive the actual outcome.

4. The method of claim 1, wherein at least one of individual agent behavior, swarm democratic behavior, cumulative agent behavior, agent tipping point behavior, time-based agent behavior, agent achievement behavior, agent location, agent development, and agent-environment effect is used to derive the actual outcome.

5. The method of claim 1, wherein the selected statistical game outcome is used to vary the player input indication to provide a modified player input indication, and wherein the modified player input indication is used to derive the actual outcome.

6. The method of claim 1, comprising:

prior to displaying the updated image, displaying a first animation of swarm behavior based on the swarm behavior model, and displaying a second animation of path-finding behavior associated with agents in the swarm.

7. The method of claim 1, comprising:

displaying swarm behavior based on the swarm behavior model until either the player input indication is received, a preselected time period has elapsed, or a location of the swarm substantially matches a statistically desired location.

8. The method of claim 1, comprising:

determining an interaction between the swarm and a fluid forming a portion of the space; and presenting the interaction as a visible portion of the updated image.

9. The method of claim 1, wherein the player input indication operates to modify an attribute of an agent in the swarm.

10. The method of claim 1, comprising:

adding or eliminating at least one swarm behavior rule responsive to the player input indication.

11. The method of claim 1, comprising:

modifying at least one swarm behavior rule responsive to the player input indication.

12. The method of claim 1, comprising:

displaying swarm behavior associated with the swarm behavior model by selecting an animation from a set of pre-recorded swarm animations.

13. An apparatus, comprising:

a graphics engine operable to generate an initial image including a subset of a swarm in a space representing a portion of a wagering game upon which monetary value may be wagered;

a processor operable to present the wagering game and to determine an actual outcome of the wagering game based on a player input indication, a swarm behavior model and a selected statistical game outcome, wherein the swarm behavior model is selected from a plurality of predefined swarm behavior models, wherein each predefined swarm behavior model is to determine a prize value for the actual outcome based on behaviors of the subset of the swarm presented in the space, and wherein the graphics engine is operable to generate an updated image derived from the initial image and the actual outcome; and a primary input device to provide the player input indication.

14. The apparatus of claim 13, wherein the primary input device is selected from at least one of a keyboard, a touch screen, a joystick, a wireless wand, a cellular telephone, a trackball, a camera, a gesture sensor, a microphone, a spring-loaded plunger, a button having adjustable tactile characteristics, a thumbwheel, a musical instrument, a dance pad, and a brain wave sensor.

15. The apparatus of claim 13, comprising:

a random number generator to provide a basis for modifying at least one of the player input indication, an attribute of some agents in the swarm, a swarm behavior rule, a display time associated with swarm behavior, and an environmental variable associated with the space.

16. The apparatus of claim 13, comprising:

a display to display a first animation of swarm behavior based on the swarm behavior model, and to display a second animation of path-finding behavior associated with agents in the swarm.

17. The apparatus of claim 13, comprising:

a filter to limit wagering game input activity to the player input indication that exceeds a preselected threshold.

18. A system, comprising:

a first wagering game machine having a graphics engine to generate an initial image including a swarm in a space representing a portion of a wagering game upon which monetary value may be wagered, and a processor operable to present the wagering game and to determine an actual outcome of the wagering game based on a player input indication, a swarm behavior model and a selected statistical game outcome, wherein the swarm behavior model is selected from a plurality of predefined swarm behavior models, wherein each predefined swarm behavior model is to determine a prize value for the actual outcome based on behaviors of the subset of the swarm presented in the space, and wherein the graphics engine is operable to generate an updated image derived from the initial image and the actual outcome; and a second wagering game machine including a primary input device to provide the player input indication.

19. The system of claim 18, comprising:

a wagering game machine server to couple to the first and the second wagering game machines, the server to present a progressive gaming environment based on the actual outcome.

20. The system of claim 18, comprising:

a plurality of player input devices coupled to the first and the second wagering game machines, wherein the player input indication is provided by a combination of the primary input device and at least one of the plurality of player input devices.

* * * * *